April 12, 1960
W. S. CROCKER ET AL
2,932,751
D.C. TORQUE MOTOR AND THE LIKE
Filed Jan. 7, 1959
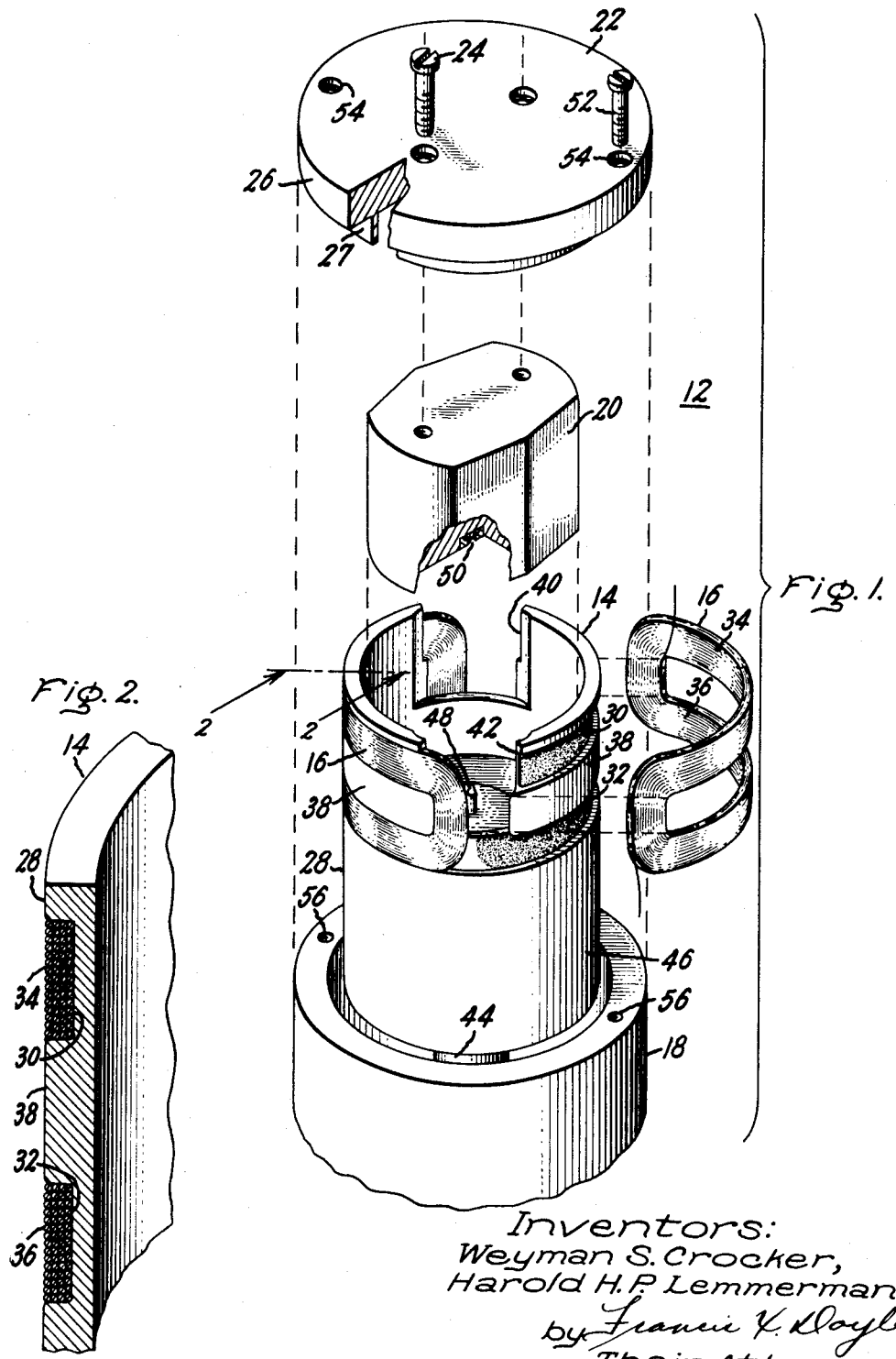
Inventors:
Weyman S. Crocker,
Harold H.P. Lemmerman,
by Francis K. Doyle
Their Attorney.

United States Patent Office 2,932,751
Patented Apr. 12, 1960

2,932,751
D.C. TORQUE MOTOR AND THE LIKE

Weyman S. Crocker, Lynnfield Center, Mass., and Harold H. P. Lemmerman, Schenectady, N.Y., assignors to General Electric Company, a corporation of New York Application January 7, 1959, Serial No. 785,377

6 Claims. (Cl. 310—154)

This invention relates to an improved D.C. torque motor and the like, and more particularly to a D.C. torque motor having a novel coil mounting means and being constructed and designed for ease of assembly.

D.C. torque motors and similar electrical devices utilize movable coils passing through a magnetic field to generate a torque when an electrical current flows through the coils. The magnetic field is static and is supported in a permeable material such as iron and is usually called a magnetic circuit. In order that the coils may pass through the magnetic field, an air gap must be designed in the magnetic circuit. Coils for use in D.C. torque motor are designed to occupy as small a space as possible in order that the air gap may be correspondingly small to provide as large a flux as possible with a minimum of magneto motive force (M.M.F.) in the magnetic circuit. However, practical consideration dictates necessary limitations on the thinness of the coil.

One such practical consideration is the coil rigidity. The coils are generally composed of a number of turns of wire which are cemented together and which are usually self-supporting in the air gap. If the section of the coil is made too small, the coil will tend to warp and lose its shape. Where the coil is mounted on a floated and balanced structure, this change in shape will generally cause an error in the torque motor output and unbalance torques due to mass shifts. A second consideration is the mechanical clearance which is necessary for the coil within the air gap. Sufficient clearance must be maintained about the coil to insure that it will not strike the sides of the air gap thus causing unwanted frictional torques. In general, coils are wound of extremely fine wire and should one of the turns be damaged the coil is rendered useless. Further, in winding self-supporting coils, it is very difficult to maintain close tolerances. Therefore, the clearance around the coils has to be proportionately large, thus requiring a large air gap.

Another problem encountered in D.C. torque motors and the like is that of assembly. In assembling the coils within the motor, extreme care must be taken not to damage the turns of the coil. Also, the assembly of the magnetic field about the coils requires extreme care to maintain proper tolerances.

From the above it can be seen that the assembly of coils and other parts for D.C. torque motors and the like presents many problems to those skilled in the art and that there is a great need present in this field for an improved motor which will provide as small a coil as possible while at the same time insuring adequate clearances within the air gap of the magnetic circuit and provide ease of assembly.

It is, therefore, one object of this invention to provide a novel coil and coil mounting means constructed to insure a predetermined concentric relation with the magnetic circuit.

A further object of this invention is to provide a D.C. torque motor with a coil of smaller size and weight, and having closer tolerances than those found in conventional D.C. motors and the like.

A still further object of this invention is to provide a novel coil mounting which rigidly supports and protects the coil.

A still further object of this invention is to provide an improved motor having parts designed with a predetermined relation to each other which simplifies the assembly of the motor.

In carrying out this invention in one form a D.C. torque motor or similar electrical device is provided with a non-magnetic, low inertia rotor having means for mounting a pre-formed coil thereon. The mounting means is designed with respect to an outer flux return ring and an inner stator of permanent magnetic material such that the pre-formed coils may be secured to the mounting means and the entire electrical device thereafter assembled with ease and dispatch.

This invention and the manner in which its objects and advantages are obtained will be better understood from the following description taken in connection with the accompanying drawing in which:

Figure 1 is an exploded view in perspective of a D.C. torque motor showing one form of this invention; and Figure 2 is an enlarged sectional view, taken on the line 2—2 of Figure 1, showing more clearly the mounting of the coil.

Referring now to the drawings, in which like numerals are used to indicate like parts throughout, and, in particular, with reference to Figure 1, a D.C. torque motor 12 is shown, being provided with a rotor 14 which is of a non-magnetic material, preferably magnesium or any suitable low inertia material designed for mounting pre-formed coils 16.

A flux return ring 18 of permeable material, such as iron, completely surrounds rotor 14 and forms the outer casing of the torque of motor 12. Stator 20, which is a permanent magnet, is centered in top plate 22 and bolted thereto by means of bolts 24, only one of which is shown in the drawing. The top plate 22, stator 20, rotor 14, and flux return ring 18 are so designed that the desired tolerances between the stator, the rotor and the flux return ring are maintained when the parts of motor 12 are assembled. Flange 26 of top plate 22 contacts the upper portion of flux return ring 18 while the lower flange 27 closely fits within flux return ring 18.

Considering particularly rotor 14 as shown in both Figures 1 and 2, the rotor 14 has an outer circumference 28, in which channels 30 and 32 are cut or molded to a depth corresponding to the thickness of coil 16. Coil 16 is placed within channels 30 and 32 and, as can be seen from Figure 2, portions 34 and 36 of coil 16 fit entirely within channels 30, 32, respectively. The coil 16 is firmly held within channels 30, 32 by cementing thereto. The spacing of channels 30, 32 provides a coil centering section 38 thereby protecting portions 34, 36 of coil 16 on all sides as shown in Figure 2. By this means the rotor can be assembled within the flux return ring 18 and the stator 20 placed within rotor 14 without danger of injuring the coils 16. Slots 40 and 42 are provided in rotor 14 and, as shown, the end turns of coil 16 extend into these slots. As is well known to those skilled in the art, slots 40 and 42 provide a path for the flow of flux from the stator 20 to the return ring 18 and back to the stator 20. With the end turns of coil 16 extending into these slots the coils necessarily pass through the magnetic field between the stator 20 and the flux return ring 18.

The rotor 14 is rotatably mounted within the flux return ring 18. This mounting may be provided by means of a shaft, or other device, 44, firmly attached to rotor 14.

A pivot means (not shown) is provided at the lower end of shaft 44, which fits within a jewel bearing (not shown) provided at the lower end of flux return ring 18. Where the torque motor 12 is to be used with a gyroscopic device, such as a rate integrating gyro, the spin motor of such device may be enclosed within the lower portion 46 of the rotor 14. In such case the shaft 44 would be an extension of the gimbal fork supporting the spin motor. The reference to a gyroscopic device is merely to illustrate the environment in which the torque motor of this invention may be used, however, it forms no part of the present invention.

Pivot means 48 are provided, as shown, within the rotor 14. Pivot 48 fits within a jewel bearing 50 in the lower portion of stator 20. The pivot 48 and bearing 50 maintain the clearance between rotor 14 and stator 20, as well as providing a rotatable mounting for rotor 14.

The construction and assembly of the improved torque motor or the like of this invention is clearly apparent from Figure 1. Coil 16 is wound on a form so as to provide a pre-formed coil as shown in Figure 1. The pre-formed coil 16 is placed within channels 30, 32 of rotor 14 and cemented thereto. Rotor 14 is then rotatably mounted within the casing 18, which forms the flux return ring of the motor. Stator 20 is bolted to top plate 22 and the top plate 22 is placed on top of casing 18. The pivot 48 and bearing 50 insure that the stator 20 is mounted concentrically within rotor 14. The top plate 22 and casing 18 may then be firmly secured by means of bolts 52, only one of which is shown, passing through holes 54 in top plate 22 and mating with tapped holes 56 in the casing 18. From this it can be seen that the torque motor 12 herein described is provided with the desired tolerances and may be easily assembled without fear of damaging the coils 16.

In one application of the rotor described herein magnesium has been used to provide a low inertia rotor. When the magnesium is anodized it is possible to maintain the form above ground by approximately 1000 volts. The new design described herein has presented a great improvement over prior torque motors. For example, in former D.C. torque motors used on rate integrating gyros, air gaps were provided in which the flux was 2000 gausses. The new design of this invention allows the flux of 6000 gausses which places the operation point of the motor at the peak energy point of the magnet. With the design shown herein an inside clearance as small as .005 inch may be obtained for a one inch diameter coil. The total air gap may be as small as .030 inch. Thus the size and weight have been reduced and the ease of assembly of the motor has been enhanced by virtue of the invention herein described.

While there has been shown and described a particular embodiment of the invention, it will be obvious to those skilled in the art that various changes may be made without departing from the spirit and scope of the invention as defined in the appended claims.

What is claimed as new and which is desired to be secured by Letters Patent of the United States is:

1. In a D.C. torque motor provided with a permanent magnet stator centrally mounted therein and an outer flux return ring forming the outer casing of the motor the improvement which comprises, a non-magnetic rotor mounted for rotation between the stator and the return ring, said rotor being provided with slots to enable flux to flow from said stator to said return ring and back to said stator, channels formed in said rotor, pre-formed coils mounted in said channels and having their end turns extending into said slots, said channels providing protection to said coils to prevent damage thereto during assembly.

2. An improved electrical device including a rotor, a stator and a flux return ring, the improvement comprising, slot means formed in the rotor to provide an air gap for flux flow to and from the return ring and the stator, channels formed in said rotor terminating at said slots, and pre-formed coils mounted on said rotor within said channels and having their end turns extending into said slots.

3. An improved electrical device for generating a signal in response to rotation which comprises, a permanent magnet stator centrally mounted within the device, a rotor formed of a non-magnetic material concentrically mounted about said stator, said rotor being provided with slots to form air gaps to allow flux to flow from said stator and to return thereto, channels formed on the side of said rotor terminating at said slots, pre-formed coils cemented to said channels and having their end turns extending into said slots, and a flux return ring completely surrounding said rotor providing a path for the flow of magnetic flux from said stator through one of said slots around said return ring and through the other of said slots back to said stator.

4. An improved electrical device for generating a signal in response to relative rotation of parts of the device comprising, a stator centrally mounted within the device, a flux return ring concentrically mounted about said stator, a non-magnetic rotor concentrically mounted between said stator and said flux return ring, means provided on said rotor for mounting pre-formed coils thereon, and air gap means provided in said rotor, the relation between said mounting means and said air gap means being such that the end turns of said coils are suspended in said air gap means.

5. An improved electrical device for generating a signal in response to relative rotation of parts of the device comprising, a stator centrally mounted within the device, a flux return ring concentrically mounted about said stator, a non-magnetic rotor concentrically mounted between said stator and said flux return ring, means provided on said rotor for mounting pre-formed coils thereon, said mounting means comprising channels formed in said rotor, an air gap means provided in said rotor, said air gap means being so formed that the end turns of said coils are suspended in said air gap means, the stator, the flux return ring and the rotor being so designed with predetermined tolerances that the electrical device may be readily assembled with said pre-formed coils mounted in said channels being protected thereby from damage during such assembly.

6. An improved electrical device for generating a signal in response to relative rotation of parts of the device comprising, a stator centrally mounted within the device, a flux return ring concentrically mounted about said stator, a non-magnetic rotor concentrically mounted between said stator and said flux return ring, means provided on said rotor for mounting pre-formed coils thereon, said mounting means comprising channels formed in said rotor whereby said pre-formed coils may be cemented therein and protected thereby, and air gap means provided in said rotor, the relation between said mounting means and said air gap means being such that the end turns of such coils are suspended in said air gap means.

No references cited.